June 7, 1960 A. BURSTEIN ET AL 2,939,631

DATA INPUT CONTROL SYSTEM

Filed Jan. 26, 1955 3 Sheets-Sheet 1

INVENTORS
Albert Burstein &
Arnold M. Spielberg
BY Morris Rabkin
ATTORNEY

INVENTORS
Albert Burstein &
Arnold M. Spielberg
BY Morris A. Rabkin
ATTORNEY

INVENTORS
Albert Burstein &
Arnold M. Spielberg
BY
[signature]
ATTORNEY 2,939,631

DATA INPUT CONTROL SYSTEM

Albert Burstein, Philadelphia, Pa., and Arnold M. Spielberg, Haddonfield, N.J., assignors to Radio Corporation of America, a corporation of Delaware Filed Jan. 26, 1955, Ser. No. 484,098

8 Claims. (Cl. 235—61.7)

Figure 1:
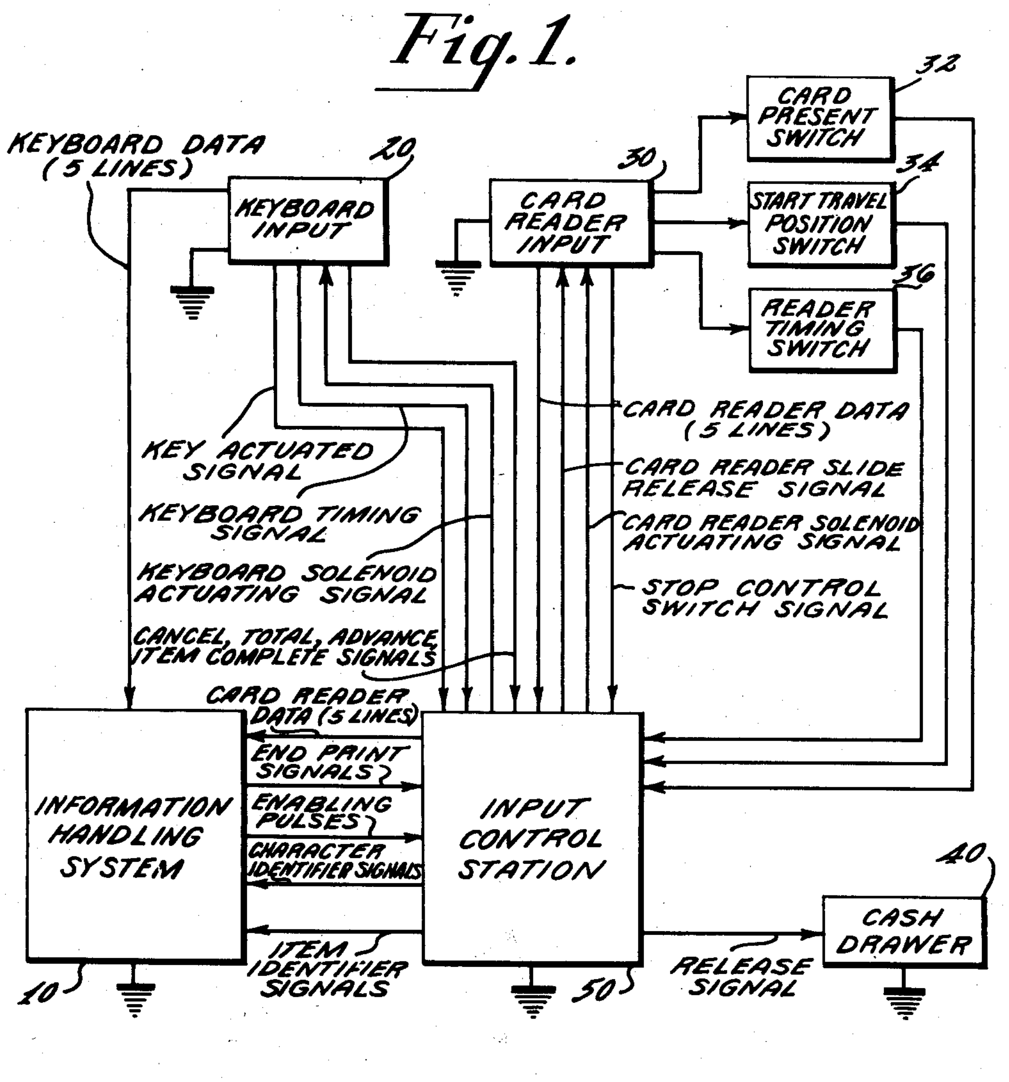

This invention relates to information handling systems, and particularly to an arrangement for providing input information to an information handling system.

Systems for automatically processing data are widely employed in commercial and industrial establishments. Initial entry of information into such systems is usually made by an operator who must sort and organize the data. It is desirable to have an input arrangement which simplifies the work of the operator and coordinates the input devices with the data processing or information handling system. It is also desirable to employ an input arrangement which minimizes the errors which may occur in the translation and entry of information. A related system is shown and described in a concurrently filed application entitled "Data Input System," by D. L. Nettleton, Serial No. 484,234, and assigned to the same assignee as the present invention.

Accordingly, it is an object of this invention to provide an improved arrangement for entering information into an automatic data processing system, which arrangement has greater flexibility than the arrangements of the prior art.

It is another object of this invention to provide an improved input system for an information handling system, which input system may receive data from manually and mechanically actuated sources and provide the data on demand to an information handling system.

It is another object of this invention to provide an improved arrangement for providing information relating to sales transactions to an information handling system, which arrangement has greater flexibility and greater ease of operation than the arrangements of the prior art.

It is yet another object of this invention to provide a novel arrangement for providing input information to an information handling system from a card reader device and a manually operated keyboard, which arrangement orders the entry of information and coordinates the operation of said keyboard and said card reader with said information handling system.

In accordance with the invention, there may be provided a system for coordinating the operation of a keyboard and a card reader with an automatic information handling system. Information for the information handling system may be supplied on a demand basis and in desired sequences to the information handling system. Stepping switches may be used to identify separate items in a sequence of items, and separate characters within each item. The stepping switches may control the location of data within the information handling system, as well as provide information to be observed by the operator. The system provides for the orderly entry of data. As each character is provided from the keyboard or card reader, the activated input device is held in operation until the character is used by the information handling system. A feature of the system is an arrangement by which the depression of special keys may provide predetermined system conditions. Another feature is an arrangement which may ascertain that the proper type of card is being read for the item then being handled.

Figure 2A:
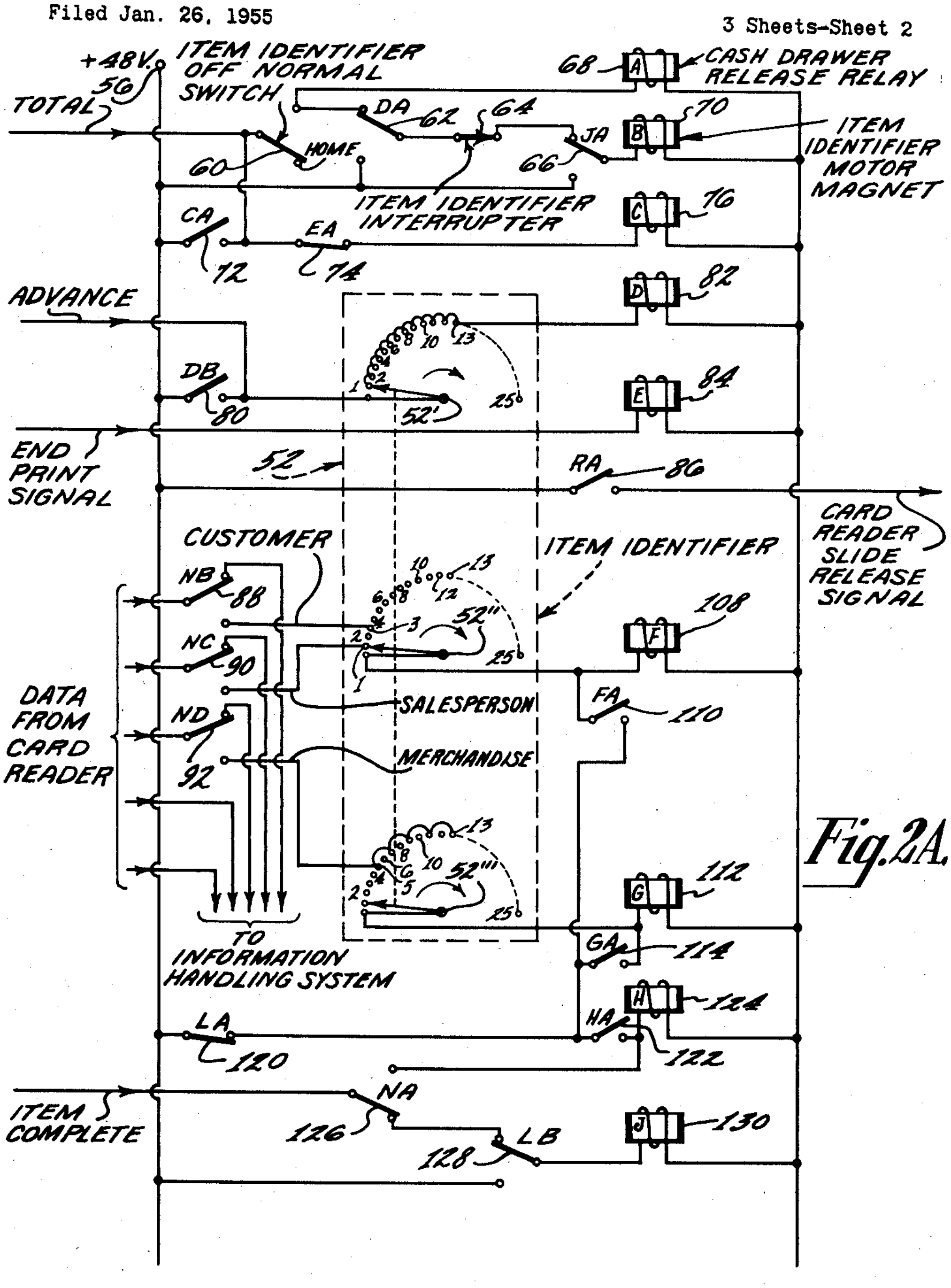
Figure 2B:
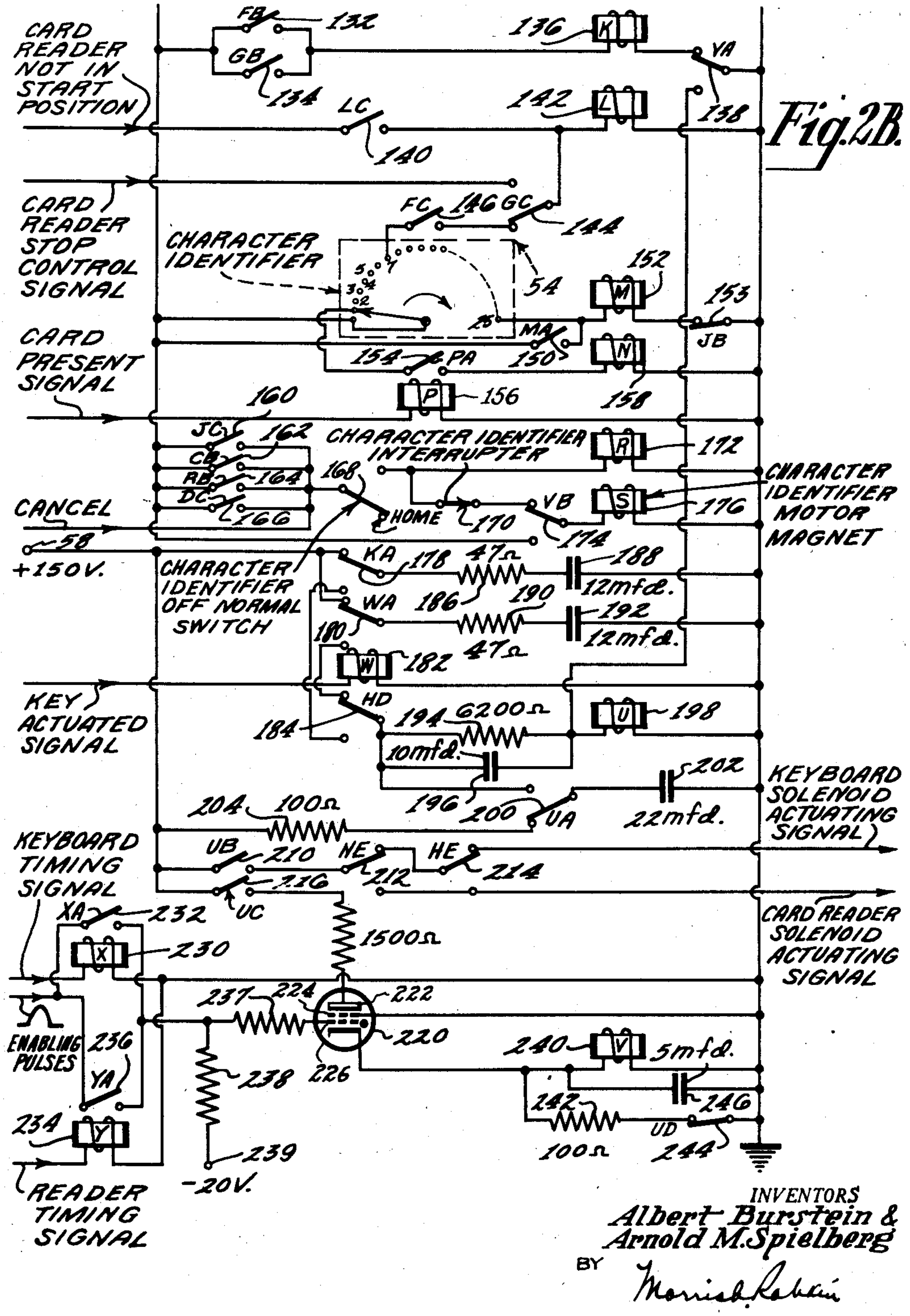

The novel features of the invention, as well as the invention itself, both as to its organization and method of operation, will best be understood from the following description, when read in connection with the accompanying drawings, in which like reference numerals refer to like parts, and in which:

Fig. 1 is a block diagram of a data processing system utilizing an input control system selectively to provide information from a keyboard input and a card reader input to an information handling system, and Fig. 2 is a circuit diagram of an arrangement which may be employed as the input control system of Fig. 1. Fig. 2 comprises two sheets, Figs. 2A and 2B, which may be joined together by placing Fig. 2A above Fig. 2B.

Referring now to Fig. 1, an arrangement for practicing the present invention may be utilized with a system for recording sales transaction information. Data pertinent to sales transactions may be supplied from a number of points in a commercial establishment to a single, centrally located, information handling system 10. The information handling system 10 stores and processes the data provided and in turn provides output information. The output information may, for example, be supplied to a printer (not shown). The information handling system 10 accepts data from the stations at each point of sale and provides an enabling or demand pulse which signifies that the information handling system 10 is ready to receive a new information character. The information handling system 10 provides a signal, here called an end print signal, on the completion of its operation on a grouping of information. Individual information characters may be grouped in blocks, which blocks are here termed items. The items may be used to distinguish classes of information. More than one item may relate to the same class of information. Items may be grouped into separate entries or transactions. The items, and characters within the items, are to be placed at predetermined points in a storage in the information handling system 10. Location of this information within the storage is governed by character identifier signals and item identifier signals supplied to the information handling system 10. The position or state of each identifier determines the signal provided.

The present arrangement utilizes an input control station 50 to coordinate the operation of a keyboard input 20 and a card reader input 30 with the operation of the information handling system 10. In addition, the input control station 50 may be employed to control the operation of a cash drawer 40. The system here shown represents a single input station for the information handling system 10. It will be understood that a modern, high-speed information handling system, such as a computer, may receive information from a considerable number of input sources and may supply the desired enabling or demand pulses and end print signals. A single input control station 50, keyboard input 20, and card reader input 30 are here shown for simplicity.

A device which may be employed for a keyboard input 20 is shown and described in a copending application for patent entitled "Keyboard Mechanism," Serial No. 474,934, filing date December 13, 1954, filed by John S. Baer and Edward A. Damerau, now Patent No. 2,903,687, issued September 8, 1959, and assigned to the assignee of the present invention. Other keyboard mechanisms may be employed, but the mechanism described in the just mentioned application is operable in the system to be described herein without special adaptation to provide a coded output. The keyboard input 20 is to provide data signals to the information handling system 10. The data signals, carried in five parallel lines, may be derived from the binary code switches 92 in the Baer and Damerau application. Signals which signify than any individual key has been actuated may be derived from the so-called solenoid start switch 114 in the Baer and Damerau application. In the present system, however, signals from the solenoid start switch 114 of Baer and Damerau are directed to the input control station 50 which provides a keyboard solenoid actuating signal at a desired time, under control of the information handling system 10. The keyboard solenoid actuating signal may be used to start the rotary solenoid 100 of the Baer and Damerau application. A signal which indicates that the code bars are fully actuated in the keyboard input 20 is used in the present system. This signal, called a keyboard timing signal, may be derived from the solenoid stop switch 120 in the Baer and Damerau application. In addition to the coded output, special control signals individual to different keys may be provided for special purposes. These signals, here called Cancel, Advance, Total, and Item Complete signals, are applied to the input control station 50.

A card reader input 30 may also be utilized to supply information, under control of the input control station 50, to the information handling system 10. While any form of card reader device may be employed, a card reader input 30 particularly suited for the present system is shown and described in a copending application entitled "Card Reader Device," Serial No. 475,447, filed December 15, 1954, by John S. Baer and Robert A. Oberdorf, now Patent No. 2,819,020, issued January 7, 1958, and assigned to the assignee of the present invention. Data supplied from the card reader 30 is directed in five parallel lines to the input control station 50 and then to the information handling system 10. The data signals may be derived from the output switches 94 of the Baer and Oberdorf application. The rotary solenoid 16 of the Baer and Oberdorf application is shown therein as actuated initially by a manual start control switch 25, after which the solenoid 16 automatically provides repeated movements until a signal is applied from a stop control switch 26. Here, an individual signal may be supplied each time it is desired to actuate the rotary solenoid 16 in the Baer and Oberdorf application. These solenoid actuating signals may be derived from the input control station 50 under control of the information handling system 10. Signals from the stop control switch 26 of the Baer and Oberdorf application may be applied to the input control station 50. In addition to these signals, added signals may be provided from other switches which may detect and signify predetermined points in the cycle of operation of the card reader input 30. These switches may be mounted on the structure described in the Baer and Oberdorf application and may provide signals to the input control station 50. A switch 32 may be mounted in the path of a card placed in the card reader, to detect the presence of a card. This switch is designated herein the card present switch. Another switch, here called the start travel position switch 34, may be mounted on the structure of the Baer and Oberdorf application to detect if the slide 30 of that application is in its start position. Another switch, here called a reader timing switch 36 may be coupled to the structure of the Baer and Oberdorf application to detect the limit of upward movement of the sensing mechanism of that application and to thereby signal that the sensing pins are fully extended.

The system shown in Fig. 1 provides information from the input mechanisms 20 and 30 to the information handling system 10 on a demand basis. Thus when the keyboard input 20 is actuated, the key actuated signal is provided to the input control station 50. The input control station 50 provides a keyboard solenoid actuating signal to the keyboard input 20. The selected key mechanism is fully actuated, as described in the above-identified Baer and Damerau application. The keyboard timing signal is provided from the keyboard input 20 to the input control station 50 when the selected key is fully depressed and the code fully set up. Simultaneously, the selected character is available on the keyboard data lines at the information handling system 10. The keyboard is maintained in operation until the data character provided is utilized. The input control station 50 also provides "character identifier" and "item identifier" signals to the information handling system 10. These signals identify item and character positions to assign storage locations for the keyboard data in the information handling system 10. An enabling or demand pulse from the information handling system 10 transfers the available data character into the system 10. Also, the input control station 50 is prepared by the enabling pulse to accept a new data character. The special control signals, each of which may be derived from a different key on the keyboard input, are here called the Cancel, Total, Advance, and Item Complete signals. The function of each of these special control signals will be more fully described in conjunction with the detailed description of the input control station 50.

Data from the card reader input 30 may also be provided to the information handling system 10. An additional verification feature may be provided to insure that information is entered by the operator in the information handling system 10 in the proper sequence. Each card may have a distinctive perforation pattern at its first perforation position. One and only one out of three specified perforation points may be used to designate whether the card contains customer, salesperson, or merchandise information. Means are provided for checking the special perforation pattern against the item class then identified by the item identifier. The input control station 50 provides solenoid actuating signals for the card reader 30 in a succession of cycles depending upon the receipt of enabling pulses from the information handling system 10. Data from the card reader input 30 may be passed into the information handling system 10 through the input control station 50. The location of information in the information handling system 10 is again controlled by signals from the input control station 50 denoting the states of the character and item identifiers. After the card has been sensed a stop control signal from the card reader 30 is applied to the input control station 50. Further information may be entered from another card or from the keyboard.

An arrangement which may be employed for the input control station 50 is shown in Figs. 2A and 2B. The connections between the input control station 50 and the other units of the system, such as the information handling system 10, are noted but for simplicity have not been shown in detail in Figs. 2A and 2B. The system includes an item identifier stepping switch 52 (Fig. 2A) and a character identifier stepping switch 54 (Fig. 2B). Stepping switches are well known and the detailed construction of the switches employed here accordingly will not be set out in detail. The item identifier 52 (Fig. 2A), however, in accordance with well known practice, may have three sets or levels of stepping contacts 52′, 52″, and 52‴, respectively. The contact arms for each level of contacts are coupled mechanically but insulated electrically. Because the operation of the stepping switches is well known, only a brief description will be provided here. A stepping switch may have a motor magnet, the application of a signal to which causes the stepping switch to step one position. The stepping switch may also include a current interrupter switch, which is closed when the motor magnet is de-energized and opened when the motor magnet is energized. A steady signal made available to the motor magnet through the interrupter switch is broken by the interrupter switch into successive pulses for advancing the stepping switch. The stepping switch may have any number of contacts, although for purposes of illustration here twenty-five are employed in the item identifier stepping switch 52 and the character identifier stepping switch 54. A stepping switch may also include an "off normal" switch which occupies either one of two positions, depending on whether the stepping switch is in its first, or "home," position, or one of its other positions. By the use of these features, switches, and proper circuit couplings, the stepping switch may be rotated to the "home" position.

A plurality of relays, including relay coils and relay controlled switches are shown in Figs. 2A and 2B. The relay coils, herein simply called relays, are identified alphabetically as well as by number. Thus, Fig. 2A provides an A relay 68 and a B relay 70. The switch arms, or simply switches, controlled by each of the relays also have both alphabetic and numeric designations. Thus, the switch arms controlled by the D relay 82 are the DA switch 62, the DB switch 80, and the DC switch 166 (Fig. 2B). The switch arms are shown in the positions they occupy when the controlling relays are not energized. Energization of a relay coil changes the contact position of all the switch arms on the energized relay coil. The stepping switches are shown in their first contact or "home" positions. The switches complete circuits between a +48 volt supply 56 (Fig. 2A) or a +150 volt supply 58 (Fig. 2B) or externally derived signals and a common conductor or ground. Values are given for various components of the system. These values illustrate one arrangement which may be employed to derive certain time relationships. Other values and time relationships may of course be employed if desired.

KEYBOARD OPERATION

It may be desired to provide characters from the keyboard input 20 to the information handling system 10 of Fig. 1. The system is started with the item identifier 52 and character identifier 54 in the "home" position. To enter the characters of an item the operator depresses the keys of the keyboard in a time succession. In addition to character input data, the operator may provide certain special control signals from the keyboard. These signals are, respectively, the Total, Advance, Item Complete, and the Cancel signals. The signals just mentioned greatly increase the flexibility of the input system and have specific effects which are described below.

A. *Operation of any key*

When an operator depresses any key on the keyboard input 20 of the system, the encoded information provided from that key is to be supplied to the information handling system 10. A key actuated signal, provided from the keyboard in the manner described above, energizes the W relay 182 (Fig. 2B). Energization of the W relay 182 completes a circuit from ground through a capacitor 192, a resistor 190, a WA switch 180, an HD switch 184, a capacitor 196 in parallel with a resistor 194, a U relay 198, and ground. Prior to the application of the key actuated signal the capacitor 192 is charged through the resistor 190 and the WA relay 180 to the potential of the +150 volt supply 58. On completion of the circuit with the U relay 198, therefore, the capacitor 192 discharges through the passive network 194, 196 to energize the U relay 198. The passive network 194, 196 serves to provide a large starting current for energizing the U relay 198.

The U relay in turn changes the contact position of the UB switch 210, the UC switch 216, and the UD switch 244. A keyboard solenoid actuating signal is provided from the +150 volt supply 58 through the circuit comprising the UB switch 210, an NE switch 212, and an HE switch 214. The keyboard mechanism is thereby power actuated and sets up and holds the predetermined code combination until the actuating signal is removed. Closure of the UC switch 216 couples the plate 22 of a thyratron 220 to the +150 volt supply 58. The screen grid 224 of the thyratron 220 is held at the potential of the common conductor. The control grid 226 of the thyratron 220 receives enabling pulses from the information handling system 10 of Fig. 1. The enabling pulses are delivered to the thyratron control grid 226 through a grid current limiting resistor 237 only when a coincident keyboard timing signal is provided. The keyboard timing signal is provided when the desired code combination is fully set up by the keyboard. The keyboard timing signal energizes an X relay 230 closing an XA switch arm 232 and coupling the source of enabling pulses to the control grid 226 of thethyratron 220. In the adsence of an enabling pulse the thyratron 220 is biased to be non-conducting by a −20 volt supply 239 coupled through a grid resistor 238 and the grid current limiting resistor 237 to the thyratron control grid 226. While the keyboard solenoid actuating signal is provided and a keyboard timing signal is provided, an enabling pulse from the information handling system effects transfer of the data character supplied by the keyboard. The input control station may therefore be set to receive a new character. Reset of the system is initiated by the enabling pulse which raises the potential of the control grid 226 and fires the thyratron 220. Current flowing when the thyratron 220 conducts energizes a V relay 240. Energization of the V relay 240 is slightly delayed by a capacitor 246. The V relay 240 when energized changes the contact positions of a VA switch 138 and a VB switch 174. The VB switch 174 completes a circuit which energizes an S relay 176. The S relay 176 acts as the character identifier 54 motor magnet. A single stepping action is derived from the character identifier motor magnet 176 when the motor magnet 176 is de-energized. The shut off of the V relay 240 after the thyratron 220 is extinguished is delayed by the coupled capacitor 246 and a parallel resistor 242. The delay, however, serves to provide a desired pulse duration. Accordingly, the S relay 176 is energized only long enough to step the character identifier 54 one position.

Energization of the V relay 240 and the consequent change of contact position of the VA switch 138 shunts the U relay 198 to ground, thus de-energizing the U relay 198. Accordingly, the UB switch 210 and UC switch 216 are opened. The keyboard solenoid actuating signal is terminated and the plate circuit of the thyratron 220 is broken. The thyratron 220 is thereby extinguished. The UA switch 200 and the UD switch 244 are reset, restoring the circuit to its start condition. Thus the completion of the pulse actuation of the V relay 240 finds the circuit elements replaced in the state existing before the first character was supplied. The character identifier 54, however, at this point in time is stepped one position from the starting state or position.

Succeeding key operations use similar signal sequences, providing a keyboard solenoid actuating signal and advancing the character identifier 54 one position. In addition to the sequences and signals described above, special operations result from the depression of the four control keys previously mentioned. These special operations are described below.

B. *Item complete*

The Item Complete, or Item, signal may be employed to define the blocks of information to be located in the information handling system. Thus, with the item identifier 52 (Fig. 2A) at a given position, all characters entered are provided to that item. To provide the characters of another item, the item identifier 52 is moved to another position. Special keys, such as the Item Complete key, are operated in the same manner as keys containing numeric and alphabetic information. The special keys, however, have additional effects. Operation of the Item Complete key signifies that all desired characters of a block have been supplied, and that the system may move to the next item.

The Item Complete signal energizes the J relay 130 (Fig. 2A) through a circuit comprising the NA switch 126, the LB switch 128, and the J relay 130. The JA switch 66 then completes a circuit between the +48 volt source 56 and the B relay 70. The B relay 70 is energized, and on subsequent de-energization provides a single stepping action for the item identifier 52. The item identifier 52 is therefore to be advanced to a new position for the next item. The JC switch 160 (Fig. 2B) closes, momentarily completing a circuit from the positive voltage supply through the character identifier off normal switch 168 and the R relay 172. The character identifier off normal switch 168 is closed and disconnected from its "home" contact because of the previous stepping of the character identifier 54. A self locking feature is provided by closure of the RB switch 164. A circuit is completed through the RB switch 164, the character identifier off normal switch 168, and the R relay 172. Closure of the RB switch 164 initiates an automatic reset of the character identifier 54, unless it is already reset. From the character identifier off normal switch 168 a circuit is also provided through the character identifier interrupter switch 170, the VB switch 174, and the S relay 176. The S relay 176 advances the character identifier 54. The S relay 176 and the character identifier interupter 170 act together to provide a series of stepping actions in the character identifier 54. The character identifier 54 steps around to its "home" position, at which point in time the character identifier off normal switch 168 opens, de-energizing the R relay 172 and the S relay 176. Thus, in summary, on receiving an Item Complete signal, the system advances the item identifier 52 one position, resets the character identifier 54, and also provides the Item Complete signal combination to the information handling system 10 of Fig. 1.

C. *Cancel*

If an operator desires to restart an item, the operator may depress a predetermined key on the keyboard mechanism 20 of Fig. 1. The selected key is here called the Cancel key and provides a Cancel signal to the system of Fig. 2B. The Cancel signal provides a cycle similar to that effected by closure of the JC switch 160. That is, the Cancel signal energizes the R relay 172 through the character identifier off normal switch 168. The R relay 172 is self locked through the RB switch 164, initiating the character identifier 54 reset cycle. Thus a revised or corrected item may be re-entered in place of the previous item.

D. *Advance*

It may be desired to terminate a sequence of items, constituting one part of an entry, and to start another sequence of items. An appropriate key on the keyboard mechanism 20 of Fig. 1, here called an Advance key, is actuated from this purpose. As with the other signal combinations provided from the keyboard, the data is supplied to the information handling system and also has other effects in the input control station. Specifically, the Advance signal is employed to reset the character identifier 54 (Fig. 2B) and to place the item identifier 52 (Fig. 2A) at position fourteen.

The Advance signal is applied to the first level 52' (Fig. 2A) of the item identifier 52. Note that a circuit exists from position one through position thirteen in the first level 52', and that position thirteen is coupled to the D relay 82. The Advance signal therefore passes through the arm of the first level 52' of the item identifier 52 and through the commonly coupled contacts and D relay 82 to ground. The D relay 82 is locked in by the closure of the DB switch 80. The DA switch 62 completes a circuit comprising the +48 volt supply 56, the DA switch 62, the item identifier interrupter switch 64, the JA switch 66, and the B relay 70. Repeated advancing actions then occur, in which the B relay 70 steps the item identifier 52 to the fourteenth position. At the fourteenth position of the item identifier 52 the circuit of the D relay 82 is broken. The D relay 82 drops out, changing the contact position of the DA switch 62 and de-energizing the B relay 70. Special information relating to sales transactions may be entered from the fourteenth to the twenty-fifth positions of the item identifier 52.

The D.C. switch arm 166 (Fig. 2B) also closes, completing the reset circuit of the character identifier 54, the action of which is described in conjunction with example B above. The system is therefore prepared to receive a new item.

E. *Total*

On completion of an individual sales transaction it may be desired to interrogate the information handling system of Fig. 1 for the data processed by it and to terminate the operation when the processed data has been supplied. An interrogation signal, here termed a Total signal, may be derived for this purpose from the keyboard input 20 of Fig. 1. As with the examples above, the coded signal combination is supplied to the information handling system. The individual Total signal also energizes the C relay 76 through the EA switch 74. The C relay 76 is self-held by the coupled CA switch arm 72. A circuit then exists between the CA switch 72, the item identifier off normal switch 60, the DA switch 62, the item identifier interrupter switch 64, the JA switch 66, and the B relay 70. Accordingly, a series of item identifier 52 stepping actions are provided by the B relay 70 and the item identifier interrupter 64 until the item identifier 52 is reset to its "home" position. When the item identifier 52 reaches its "home" position the item identifier off normal switch 60 is moved to its "home" position, breaking the circuit of the B relay 70 and terminating the stepping actions. The Total signal also passes through the item identifier off normal switch 60 to energize the A relay 68. The relay 68 may comprise a cash drawer release relay to open a cash drawer 40 in the system of Fig. 1. The cash drawer release relay 68 and the item identifier motor magnet 70 are both de-energized when the item identifier off normal switch 60 is returned to its "home" position.

Activation of the C relay 76 closes the CB switch 162 (Fig. 2B), energizing the R relay 172 through the character identifier off normal switch 168. The character identifier 54 is therefore returned to its "home" position by a reset cycle similar to that previously described.

Detection of the Total signal by the information handling system 10 of Fig. 1 results in the printing of output information relating to the sales transaction. An End Print signal may be supplied to the input control station when the print out operation is completed. The End Print signal energizes the E relay 84 (Fig. 2A) opening the EA switch 74. The C relay 76 is thereby de-energized, the CA switch 72 opened, and the system restored to its starting condition.

OPERATION OF THE CARD READER

A. *Each card*

Cards which may be employed with the system are here divided for purposes of illustration into three general classes: salesperson cards, customer cards, and merchandise cards. In the entry of a complete block of sales transaction information it may be desired to keep the different types of information distinct and in a predetermined order. It is here assumed that the first character position of each card has a distinctive perforation pattern and employs only three of the five perforation positions. Further, one and only one of the positions may be perforated, to identify the separate class of information the card carries.

The item identifier 52 positions are here employed to delineate the order in which the different classes of information are to be entered. A visual indicator coupled to the item identifier 52 may show the operator the position of the item identifier 52. Salesperson information is to be entered when the item identifier 52 is in its first position. Customer information is to be entered with the item identifier 52 in third position. Merchandise information may be entered with the item identifier 52 in 5th, 7th, 9th, 11th, or 13th position. The 14th to the 25th positions may be employed for special information.

It is assumed here that salesperson and customer cards may provide all desired information in six character positions after the first position. Such cards may then be returned to the person involved, whereas a merchandise card may be deposited at a common point by the card reader.

The reading of each card starts with the item identifier 52 (Fig. 2A) at a predetermined position and the character identifier 54 (Fig. 2B) in its first position. A card placed by the operator in the card reader 30 of Fig. 1 closes the card present switch 32 of Fig. 1, providing the card present signal. The card present signal energizes the P relay 156, closing the coupled PA switch 154. A circuit thus exists between the +48 volt supply 56 (Fig. 2A), the first position contact of the character identifier 54 (Fig. 2B), the PA switch 154, and the N relay 158. The N relay 158 in turn sets up the input control station for card input. The NA switch 126 (Fig. 2A) couples the Item Complete signal line to the H relay 124. The NB switch 88, the NC switch 90, and the ND switch 92 direct the data lines which carry information as to the type of card employed to the item identifier 52. The NE switch 212 (Fig. 2B) is coupled to the card reader solenoid actuating signal line.

To start card sensing, the operator depresses the Item Complete key on the keyboard 20 of Fig. 1. The key actuated signal first provided energizes the W relay 182, changing the contact position of the WA switch arm 180. A circuit momentarily exists, therefore, between the capacitor 192, resistor 190, WA switch 180, HD switch 184, passive network 194, 196, and U relay 198. The capacitor 192 discharges through and energizes the U relay 198. The UA switch arm 200 also is placed in the circuit of the U relay 198, discharging a previously charged capacitor 202 through the passive network and the U relay 198.

A card reader solenoid actuating signal thus is initially provided from the circuit comprised of the +150 volt supply 58, the UB switch 210, and the NE switch 212. The Item Complete signal provided following the key actuated signal energizes the H relay 124 (Fig. 2A) through the NA switch 126. The H relay 124 closes the HA switch arm 122, and is held through the circuit of the LA switch 120, HA switch 122, and H relay 124. The subsequent change of contact position of the HD switch 184 (Fig. 2B) breaks the path between one capacitor 192 and the U relay 198. The U relay 198 remains energized, however, because of the discharge provided by the coupled capacitor 202. Subsequently, when the first perforation position is sensed, the system is set up to cyclically generate a succession of card reader solenoid actuating signals. This action is described below in examples B and C.

A reader timing signal is provided when the card is fully sensed. The reader timing signal energizes the Y relay 234, closing the YA switch arm 236. The next enabling pulse fires the thyratron 220, undertaking the sequence previously described which terminates the card reader solenoid actuating signal.

The input control station utilizes different sequences to ascertain that a card is being read at the proper point in a sequence and to control the employment of the card. The special perforation patterns are checked against the item then identified by the item identifier. These sequences are described below.

B. *Customer or salesperson card*

Three perforation points of the five available at the first perforation position on a card identify the class of information stored by the card. These positions, used only one at a time, correspond to the NB switch arm 88, the NC switch arm 90, and the ND switch arm 92 in the data lines from the card reader. The NC switch 90, for example, is in the line corresponding to the position identifying a card as a salesperson card. Assume first that the reading of a salesperson card is begun with the item identifier 52 correctly in its first position. The signal provided from the selected point of the first card perforation position energizes the F relay 108 through the NC switch 90 and the second level 52" of the item identifier 52. The F relay 108 closes and is self-held by the FA switch arm 110. The energization of the F relay 108 closes the FB switch 132 (Fig. 2B), energizing the K relay 136. Subsequent closure of the KA switch 178 completes a circuit comprising a capacitor 188, a resistor 186, the KA switch 178, the HD switch 184, the passive network 194, 196, and the U relay 198.

During the just-described sequence the first card reader solenoid actuating signal is continuously provided. The sequence is properly completed because the card reader timing signal is not available until the card is fully sensed. When the first enabling pulse occurs following the card reader timing signal the card reader solenoid actuating signal is terminated as described above. The arrangement also, however, provides the desired sequence of cyclically generated card reader solenoid actuating signals.

On energization of the V relay 240 during conduction of the thyratron 220, the K relay 136 is de-energized. The KA switch 178 shifts contact positions, charging the capacitor 188 from the +150 volt supply 58. On de-energization of the V relay 240 following the extinction of the thyratron 220, the VA switch again completes the circuit of and energizes the K relay 136. In accordance with the illustrative values provided, the energization of the V relay 240 may last about 50 milliseconds. The 50 millisecond period determines the repetition rate of the card reader solenoid actuating signals. The termination of the card reader solenoid actuating signal is also marked by a single energization of the character identifier motor magnet 176 through the VB switch 174. The character identifier 54 is thus stepped one position from its "home" position.

To recapitulate, the F relay 108 (Fig. 2A) and H relay 124 remain energized after the sensing of the first perforation position. The K relay 136 (Fig. 2B), however, maintains a state dependent upon the state of the thyratron 220. The U relay 198 is energized by use of the KA switch 178 and the HD switch 184. Following the shift of the character identifier 54 the N relay 158 is de-energized, and subsequent card reader solenoid actuating signals are derived from the circuit UB switch 210, NE switch 212, and HE switch 214.

De-energization of the N relay 158 also shifts the contact positions of the NB switch 88, the NC switch 90, and the ND switch 92. Thus further signals provided from the card reader are directed to the information handling system 10 of Fig. 1.

As the successive card positions are sensed the character identifier 54 (Fig. 2B) is stepped. When the seventh position is reached all desired data on the salesperson card has been read. The character identifier 54 and coupled circuits are therefore employed to terminate the sensing. At the seventh position a circuit exists between the +48 volt supply, character identifier 54, the closed FC switch 146, the GC switch 144, and the L relay 142. The L relay 142 is energized and self-held through the LC switch 140. The signal from the start travel position switch 34 of Fig. 1 which indicates that the card reader is not in start position energizes the L relay 142. Energization of the L relay 142 breaks the LA switch 120 (Fig. 2A) de-energizing the F relay 108 and the H relay 124.

The LB switch 128 (Fig. 2A) couples the J relay 130 to the +48 volt supply 56 and energizes the J relay 130. The JA switch 66 energizes the B relay 70 from the +48 volt supply 56. On subsequent de-energization of the B relay 70 the item identifier 52 is stepped one position. The JC switch 160 (Fig. 2B) closes, energizing the R relay 172 and the S relay 176, then the RB switch arm 164, to effect the reset cycle of the character identifier 54 in the manner described above. Activation of the R relay 172 closes the RA switch 86 (Fig. 2A), providing the card reader slide release signal to the card reader mechanism of Fig. 1. When the card reader slide reaches its start position the signal which denotes that the card reader is not in start position ceases. Thus the L relay 142 (Fig. 2B) is de-energized, the LB switch 128 (Fig. 2A) changes contact positions and the J relay 130 is de-energized. The B relay 70 is de-energized on the subsequent change of contact positions of the JA switch 66.

Note that if the item identifier 52 (Fig. 2A) is in improper position (not on the first position) for a salesperson card the F relay 108 is not energized and the automatic cycling operation is not accomplished. Entry of card information in the wrong order is thereby avoided. To return the card to its start position for removal the operator may depress the Cancel key. The Cancel signal thus provided energizes the R relay 172 (Fig. 2B) and the S relay 174. The character identifier 54 is thus reset. Concurrently, the RA switch 86 (Fig. 2A) is closed, providing a slide release signal to the card reader 30 of Fig. 1. The item identifier 52 is not advanced, so that the proper card for the sequence may be entered and read.

In summary, the salesperson card is first identified by the system as being provided at the proper time. The information on the card is read under control of the information handling system. After seven perforation positions have been sensed and the data therefrom utilized, the character identifier 54 (Fig. 2B) is reset and the input control station is prepared to receive new information. The new information may be either manually provided from the keyboard or automatically provided from the card reader. The sequence involved with a customer card is like that of the salesperson card, except that the first perforation position provides a signal through the NB switch 88 (Fig. 2A) to the third position of the second level 52''' of the item identifier 52.

C. *Merchandise card*

As pointed out above, it is assumed here that a merchandise card is to be read with item identifier at positions 5, 7, 9, 11, or 13. The third level 52''' of the item identifier 52 is employed with a merchandise card. The perforation in the first perforation position on the merchandise card corresponds to the ND switch 92. Assume that the third level 52''' of the item identifier 52 is on the proper position. A merchandise card may be placed in the card reader of Fig. 1 and the sensing of the card may be commenced, as above, by the provision of the Item Complete signal. The first sensing operation therefore takes place as described above with respect to Example B. G relay 112 is energized by the signal provided from the card reader through the ND switch 92, the item identifier third level 52''', and the G relay 112. The G relay 112 is self locked by the coupled GA switch arm 114. Using the G relay 112 and the H relay 124, successive sensing operations are accomplished in a manner similar to that described in Example B. Each sensing operation is terminated following the firing of the thyratron 220 (Fig. 2B). The entire merchandise card is to be sensed. Thus all twenty-five positions of the character identifier 54 are to be employed before the system is reset.

When the character identifier 54 has reached its final or twenty-fifth position the M relay 152 is energized through the character identifier 54 and the JB switch 153. The card reader may be advanced more than twenty-five positions in order to eject the card. If the additional steps provide spurious data signals the energization of the M relay 152 may be used to block out such spurious information. Note that the self-cycling arrangement steps the character identifier 54 up to the twenty-fifth position. The VB switch 174 closes on the +48 volt supply 56 to energize the character identifier motor magnet once for each sensing cycle.

Reset of the character identifier 54 and the card reader slide occurs when the card reader has reached the extent of its travel. The card reader stop control signal then provided energizes the L relay 142 through the GC switch 144. The J relay 130 (Fig. 2A) is thus energized through the LB switch 128. The LA switch 120 is broken, de-energizing the G relay 112 and the H relay 124. The R relay 172 (Fig. 2B) is energized through the JC switch 160 and the character identifier off normal switch 168. Subsequent closure of the RB switch 164 provides the cycle which resets the character identifier 54. Concurrently, the card reader slide release signal is provided from the +48 volt supply 56 (Fig. 2A) through the RA switch 86. The energization of the J relay 130 also completes the circuit of the JA switch 66 and the B relay 70. On termination of the signal the item identifier motor magnet 70 advances the item identifier 52 one position.

As the card reader slide is returned to its start position, therefore, the card having been removed from it, the system is restored to its start condition with the item identifier 52 advanced one position. As in example B, if the card is entered to be read with the item identifier 52 in the wrong position the self-cycling arrangement is not activated and the card is not read. After the card has been sensed, keyboard or other card information may be supplied at the next or a later item position.

SUMMARY

Information may be provided from various input mechanisms on a demand basis to an information handling system. The system described provides a simple means of coordinating the operation of the input mechanisms and the information handling system. Further, the system establishes an order in which various items, such as items pertaining to a sales transaction, may be entered into the information handling system. As an illustration, the various items (from 1 to 25) may be used in the following way for the following classes of information:

(1) Salesperson number
(2) Type of sale (C.O.D., cash)
(3) Customer number
(4) Quantity
(5) Stock number
(6 to 13) Repeats of 4 and 5
(14) Non-merchandise (monogram, gift wrap, exchange)
(15) Dollar amount
(16 to 23) Repeats of 14 and 15
(24) Total
(25)

The system provides many features for the rapid and reliable entry of these items. The item identifier may indicate which of the items is next to be employed. By operation of certain special keys (Cancel, Total, Advance, and Item Complete) desired points and operations in the sequence may be rapidly selected. Where information is to be entered from cards the system ascertains that the proper class of information is being entered for the item identifier state or position. The item identifier and character identifier also provides a simple and ready means for locating both character and item information in the information handling system.

Thus there has been described an efficient and rapid system for providing and utilizing input information on a demand basis. The information may be entered at predetermined locations, as needed, in an information handling system. Different sources of input information, such as manually and mechanically operated devices, may be employed. Checking features are provided to aid maintenance of predetermined order for the classes of information. Input mechanisms are maintained in operation until the character data provided is demanded.

What is claimed is:

1. An arrangement for providing input data on a demand basis from an input mechanism to an information handling system providing a demand signal, said arrangement comprising stepping means for identifying groupings of said characters, means responsive to said input data for operating said stepping means, means responsive to said input data for maintaining said input mechanism in operation until said demand signal is provided, and means responsive to said input mechanism and coupled to said operation maintaining means for maintaining operation for providing cyclic operation of said input mechanism.

2. An arrangement for providing card and keyboard character information from card reader and keyboard input mechanisms to an information handling system upon the occurrence of a demand signal provided by said information handling system, said arrangement comprising stepping means for identifying item groupings for said characters, means responsive to said character information for operating said stepping means, means responsive to said character information and said demand signal from said information handling system for selectively maintaining said card reader and keyboard in operation until the occurrence of said demand signal, and circuit means responsive to said card reader mechanism and coupled to said operation maintaining means for selectively maintaining operation for providing successive sequences of operation of said card reader mechanism.

3. A control system for providing characters in item groupings from card reader and keyboard mechanisms, said characters being provided to an information handling system providing demand signals, cards to be read including perforation patterns distinctive to particular item groupings, said control system comprising stepping switch means having a plurality of positions and coupled to said information handling system for identifying item groupings for said characters, means responsive to said characters for controllably setting said stepping switch means, means responsive to said characters and said demand signals for actuating said card reader and said keyboard mechanisms for controlled periods, means coupled to said stepping switch means and responsive to said card reader mechanism for recognizing the distinctive perforation patterns, and means responsive to said recognizing means and coupled to said actuating means for operating said card reader mechanism in successive cycles.

4. A system for providing card and keyboard character information in item groupings from card reader and keyboard input mechanisms to an information handling system providing demand signals, cards to be read including patterns distinctive to particular item groupings, said system comprising stepping means for identifying item groupings for said characters, means responsive to said character information for operating said stepping means, means responsive to said character information and said demand signals for selectively maintaining said card reader and keyboard in operation until a demand signal is provided, means coupled to said stepping means and responsive to said card reader mechanism for recognizing the distinctive card patterns, and means responsive to said recognizing means and coupled to said operation maintaining means for providing successive sequences of operation of said card reader mechanism.

5. A control system for providing character input data relating to sales transactions from a card reader mechanism and a keyboard mechanism to an information handling system providing demand signals, said card reader and said keyboard providing character signals and said keyboard mechanism providing additional special control signals, cards to be read including special perforation patterns denoting the class of information recorded on the cards, said control system comprising first stepping switch means having a plurality of levels for identifying item classes of data to be provided, second stepping switch means for identifying character positions within item classes, means responsive to said character signals for maintaining said card reader and keyboard in operation, means responsive to said demand signals for de-energizing said last-mentioned means in a timed sequence, means responsive to said special control signals for energizing said first stepping switch means, means responsive to said character signals and said special control signals for energizing said second stepping switch means, means responsive to said keyboard and coupled to said first stepping switch means for checking said special perforation patterns against the then identified item class, and means responsive to said means for checking and coupled to said means for maintaining said card reader and keyboard in operation and said means for de-energizing for providing a succession of operating cycles.

6. A control system for providing character input data relating to sales transactions from a card reader mechanism and a keyboard mechanism to an information handling system, said card reader and keyboard mechanisms providing character signals and being operable to provide said signals until de-energized, said keyboard mechanism providing additional control signals, said character input data to be grouped into different items denoting separate classes of information for said information handling system, cards to be read including special perforation patterns denoting the class of information recorded on the cards, said control system comprising first stepping switch means having at least three levels and coupled to said information handling system for identifying item classes of information to be provided, second stepping switch means coupled to said information handling system for identifying characters to be provided within items, relay means responsive to said character signals selectively to operate said card reader and keyboard mechanisms, means including relay means and thyratron means for de-energizing said means to operate said card reader and keyboard mechanisms in a timed sequence, relay means, including reset means, responsive to said special control signals for controllably setting said first stepping switch means, relay means, including reset means, for controllably setting said second stepping switch means, relay means responsive to character signals from said keyboard and coupled to said first stepping switch means for checking said special perforation patterns against the item class of information then denoted by said first stepping switch means, means including capacitor and relay means responsive to said checking means and coupled to said means to operate said card reader and keyboard mechanisms and to said de-energizing means to provide a succession of operating cycles, and means responsive to said first and second stepping switch means selectively to terminate the operation of said means to provide a succession of operating cycles.

7. In an information handling system including a card reader mechanism for reading cards, each of said cards having a first portion containing a perforation pattern to denote the class of information recorded on said card, and additional portions containing perforation patterns representing said information, an arrangement for controlling the reading of said additional card portions comprising ordering means for selecting a class of information to be read, means for providing a succession of operating signals for said card reader, means responsive to said card reader mechanism and coupled to said ordering means for comparing the class represented by perforation pattern in the said first card portion to the class selected by said ordering means, and means responsive to said comparing means to energize said operating signal providing means for reading said additional card portions only if the card information is of the selected class.

8. In an information handling system including a card reader mechanism for reading cards, each of said cards having a first portion containing a perforation pattern to denote the class of information recorded on said card, and additional portions containing perforation patterns representing said information, an arrangement for controlling the reading of said additional card portions comprising ordering means for selecting a class of information to be read, means for providing a succession of operating signals for said card reader, means responsive to said card reader mechanism and coupled to said ordering means for comparing the class represented by the perforation pattern in the said first card portion to the class selected by said ordering means, means responsive to said comparing means to energize said operating signal providing means for reading said additional card portions only if the card information is of the selected class, and means to reject said card if said first portion perforation pattern represents a nonselected class.

References Cited in the file of this patent

UNITED STATES PATENTS 2,602,545 Luhn et al. ............. July 8, 1952

UNITED STATES PATENT OFFICE

CERTIFICATE OF CORRECTION

Patent No. 2,939,631 June 7, 1960

Albert Burstein et al.

It is hereby certified that error appears in the printed specification of the above numbered patent requiring correction and that the said Letters Patent should read as corrected below.

Column 6, line 1, for "22" read -- 222 --; line 14, for "thethyratron" read -- the thyratron --; column 7, line 57, for "from" read -- for --; column 8, line 29, for "64" read -- 62 --; column 9, line 54, for "held" read -- self-held --; column 11, line 57, after "with" insert -- the --.

Signed and sealed this 31st day of January 1961.

(SEAL)
Attest:

KARL H. AXLINE
Attesting Officer

ROBERT C. WATSON
Commissioner of Patents